United States Patent [19]

Peerman et al.

[11] Patent Number: 4,543,369
[45] Date of Patent: Sep. 24, 1985

[54] ALKOXYLATED POLYESTER POLYOLS AND POLYURETHANES MADE THEREFROM

[75] Inventors: Dwight E. Peerman; Edgar R. Rogier, both of Minnetonka, Minn.

[73] Assignee: Henkel Corporation, Minneapolis, Minn.

[21] Appl. No.: 665,254

[22] Filed: Oct. 26, 1984

Related U.S. Application Data

[62] Division of Ser. No. 415,522, Sep. 7, 1982.

[51] Int. Cl.$^4$ .................. C08G 18/14; C08G 18/48; C08G 18/42
[52] U.S. Cl. .................. 521/137; 521/172; 521/177; 528/74; 528/75; 528/76; 528/77; 528/79
[58] Field of Search .................. 528/74, 75, 76, 77, 528/79; 521/137, 172, 177

[56] References Cited

U.S. PATENT DOCUMENTS

| B 358,260 | 3/1976 | Bondy | 260/29.7 |
|---|---|---|---|
| 2,542,550 | 2/1951 | McDermott | 260/410.6 |
| 3,234,249 | 2/1966 | Brack | 521/172 |
| 3,455,886 | 7/1969 | Yersnel | 521/172 |
| 3,459,733 | 8/1969 | Byrd et al. | 521/172 |
| 3,910,879 | 10/1975 | Syrop et al. | 528/77 |
| 4,423,162 | 12/1983 | Peerman et al. | 521/172 |
| 4,435,592 | 3/1984 | Reichel | 521/137 |
| 4,481,309 | 11/1984 | Straehle et al. | 528/77 |

FOREIGN PATENT DOCUMENTS 1524782  9/1978  United Kingdom ............ 260/410.6

*Primary Examiner*—Herbert S. Cockeram
*Attorney, Agent, or Firm*—Ernest G. Szoke; J. Daniel Wood

[57] ABSTRACT

Alkoxylated polyester polyols useful in the manufacture of polyurethanes are disclosed. For example, 9(10)-methylhydroxymethyloctadecanoate can be reacted with bishydroxymethyltricyclodecane to prepare a polyester polyol which can be ethoxylated to prepare an alkoxylated polyester polyol. The resulting polyester polyol can be reacted with a diisocyanate, such as a modified diphenylmethane diisocyanate, to prepare a urethane elastomer.

35 Claims, No Drawings

ALKOXYLATED POLYESTER POLYOLS AND POLYURETHANES MADE THEREFROM

This application is a divisional application of copending application Ser. No. 415,522, filed Sept. 7, 1982.

CROSS REFERENCE TO RELATED APPLICATION

This application discloses material which is also disclosed in co-pending application Ser. No. 415,718, filed Sept. 7, 1982, now U.S. Pat. No. 4,496,487, by the same inventors.

BACKGROUND OF THE INVENTION

1. Field of the Invention

This invention describes alkoxylated polyester polyols which are useful, among other purposes, in the manufacture of urethane polymers.

2. Description of the Art Practices

It is known that polyols may be formulated from many materials. For instance the work of Hostettler, and Hostettler et al in U.S. Pat. No. 2,933,477 issued Apr. 19, 1960, U.S. Pat. No. 2,962,524 issued Nov. 29, 1960, and U.S. Pat. No. 2,962,455 issued Nov. 29, 1960, teaches that caprolactone may be utilized to form polyols which are then useful in the formation of other materials such as urethanes. However, the Hostettler, and Hostettler et al materials are solids and thus are of limited utility because they must be heated above their melting point in order to be capable of reacting effectively with other materials.

It is known from U.S. Pat. No. 2,599,468 issued June 3, 1952 to McKeever that 9(10)hydroxymethyloctadecanol may be prepared. This material is normally a solid although it is sometimes found as a super cooled liquid. While this material might be useful for several purposes it is expensive to obtain in that the normal route of processing is from oleic acid. That is, while the hydroxymethyl formation through the oxo process may be conducted relatively simply on this material, there is difficulty and expense involved in converting the carboxylic group to an alcohol. DeWitt et al in U.S. Pat. No. 3,242,414 issued Mar. 29, 1966 discloses that electrically resistant materials may be formed from the alcohols described in the aforementioned McKeever patent. It is known that acrylic esters of the materials of McKeever may be formulated through the disclosures of German Offenlegungsschrift No. 2,200,021 published July 26, 1973 by Wegemund. It is also known from U.S. Pat. No. 3,043,871 to Buchner et al issued July 10, 1962 that the diacid corresponding to the alcohol of McKeever may be formed.

The work of the United States Department of Agriculture at the Northern Regional Laboratory at Peoria, Ill., has lead to the conversion number of unsaturated fatty compounds which may be further converted to useful materials. For instance, in U.S. Pat. No. 3,787,459 issued Jan. 22, 1974 to Frankel there is disclosed formyl derivatives of carboxylic acids. In U.S. Pat. No. 3,928,231 issued Dec. 23, 1975 to Frankel there is also disclosed the formation of polycarboxylic acids derived from fatty materials. In U.S. Pat. No. 4,093,637 issued June 6, 1978 to Miller the use of esters of fatty derived materials as polyvinylchloride plasticizers is disclosed. Esters of materials containing hydroxyl groups are described in U.S. Pat. No. 4,083,816 issued Apr. 11, 1978 to Frankel et al.

There are further disclosures of materials by the United States Department of Agriculture in a paper entitled Carboxystearic Acid Esterification and Interchanges dated Nov. 11, 1971 by Dufek et al. A second publication of Dufek et al entitled Some Esters of Mono- Di- and Tricarboxystearic Acid as Plasticizers; Preparation and Evaluation, Volume 53 JAOCS, p. 198, May 1976 discusses the uses of polycarboxylate esters. The formation of a hydroxymethyl triglyceride product by hydroformylation and hydrogenation of oleic safflower oil is referred to by Frankel et al in JAOCS Vol. 48, No. 5, p. 248 entitled Methyl 9(10)-Formylstearate by Selective Hydroformylation of Oleic Oils. Hydroxymethyl fatty alcohols are also described in the work of Frankel et al in JAOCS Vol. 52, 12, p. 498, 1975, entitled Acyl Esters of Oxo-Derived Hydroxymethylstearates as Plasticizers for Polyvinyl Chloride.

It is also known from German Pat. No. 934889 published Nov. 10, 1955 that certain tricyclic esters may be formed. Similar work in this regard is found in United States patent application Ser. No. 194,172 by Rogier filed Oct. 6, 1980. Similar disclosures of polycyclic alcohols are found in German Offenlegungsschrift No. 2,200,022 laid open for inspection July 19, 1973. Further disclosures of such materials are found in derivatives of Dicyclopentadiene—Valuable Key Compounds, Cornils et al published in Chemiker Zeitung 98, (2), 70-76, 1974.

The disclosures of the foregoing references, to the extent that they are applicable to the present invention, are hereby incorporated by reference.

SUMMARY OF THE INVENTION

The subject invention is directed to alkoxylated polyester polyols formed by reacting at least one nongelling polyester polyol of the formula:

$$R-O-A-H]_p$$

where
R is a polyol residue;
p is an integer from 2 to 6; and,
A, which may be the same or different, is selected from the group consisting of $A_1$, $A_2$, and $A_3$ and combinations of $A_1$, $A_2$ and $A_3$,
where

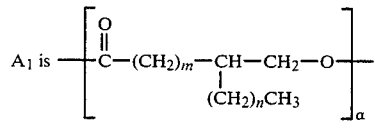

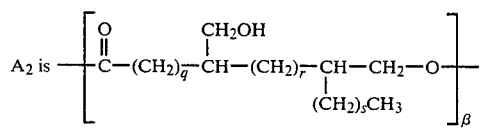

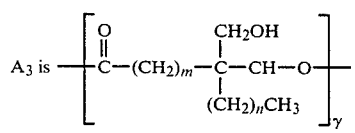

where m, n, q, r, s, $\alpha$, $\beta$ and $\gamma$ are integers such that m is greater than 3, n is greater than or equal to zero, and the sum of m and n is from 11 to 19, inclusive; q is greater than 3, r and s are each greater than or equal to zero and the sum of q, r and s is from 10 to 18, inclusive; $\alpha$, $\beta$ and $\gamma$ are each from 0 to 10, inclusive, all $\alpha$'s, $\beta$'s, and $\gamma$'s are not zero with at least one alkylene oxide in a ratio of moles of alkylene oxide per equivalents of hydroxyl in the polyester polyol from about 0.5:1 to 5:1.

The alkoxylated polyester polyols of the invention have reactive hydroxyl groups which, when reacted with polyisocyanates, form polyurethanes.

DETAILED DESCRIPTION OF THE INVENTION

The compounds of the invention are prepared by alkoxylation of polyester polyols. The polyester polyols are the subject of co-pending application Ser. No. 415,718, now U.S. Pat. No. 4,496,487, filed concurrently with this application. As disclosed in that co-pending application, the polyester polyols are prepared by a reaction of A—B type hydroxy ester monomer such as methyl 9(10)-hydroxymethyloctadecanoate and an initiating polyol of the type $R(OH)_p$, R representing the residual proportion of the polyol and p is as defined previously.

The reaction can be represented by the following equation $$j(A-B) + R(OH)_p \rightarrow R[O(B-A)_j-H]_p$$

If A—B represents a hydroxyester, HO—R''—CO$_2$R''', then the reaction becomes $$j(HO-R''-CO_2R''') + R(OH)_p \longrightarrow$$

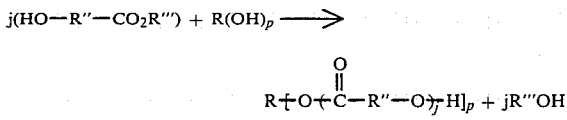

$$R{+}O{+}\overset{O}{\underset{\|}{C}}-R''-O{\mathbin{\}}}H]_p + jR'''OH$$

The resulting multichain polyester polyols are composed of p chains and thus have a hydroxyl functionality of p which corresponds exactly with the functionality of the starting polyol $R(OH)_p$. Cross-linking is precluded since the terminal hydroxyl groups do not react with themselves under the reaction conditions. The average length j of the chains is controlled by the relative proportion of the hydroxy ester monomer to the polyol reactant and the extent of the condensation, which is generally carried to completion.

The hydroxyester monomer starting material is prepared by hydrogenation of hydroformylated unsaturated carboxylic acids or esters. The starting unsaturated acids are obtained most conveniently by splitting a triglyceride into its respective component fatty acids. Such sources of fatty acids which are unsaturated include tallow and most plant sources particularly soybean, sesame, sunflower, tall oil and other similar materials. For the purposes of processing, the starting fatty acids are conveniently obtained in the form of the methyl ester.

The introduction of the hydroxymethyl group can be readily accomplished by a hydroformylation process utilizing either cobalt or rhodium catalysts, followed by hydrogenation of the formyl group to obtain the hydroxymethyl group by catalytic methods or by chemical reduction. This procedure is described in detail in U.S. Pat. Nos. 4,216,343, 4,216,344, 4,304,945, and 4,229,562 of Rogier and references discussed therein and, to the extent necessary to the understanding of the subject invention, each of these patents and references is hereby incorporated by reference.

When a mono-unsaturated fatty acid ester is used as the starting material, a mono-hydroxymethyl ester of the following formula is obtained (using the methyl ester as an example):

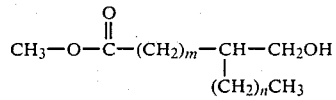

For most of the commonly available mono-unsaturated fatty acids, m > 3 and n is a value such that the sum of m and n is between 11 and 19. Thus, for example, the product obtained when the methyl ester of oleic acid is the starting material is 9(10) methyl hydroxymethyloctadecanoate of the formula:

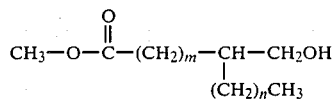

where
m is 8 or 7, and
n is 7 or 8.

The designation 9(10) in the name of this compound and the alternative designations for m and n in the formula indicate that the product is, in fact, a mixture of the 9 and 10 isomers with respect to the hydroxymethyl group, as a result of the alternative positioning of the formyl group in the hydroformylation process.

When a di-unsaturated fatty acid ester is selected as the starting material, a di-hydroxymethyl ester of the following formula is obtained via the rhodium catalyzed hydroformylation process (again using the methyl ester as an example):

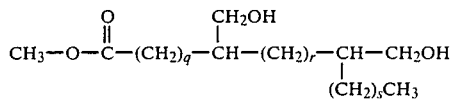

For most commonly available di-unsaturated fatty acids, q will be > 3, r and s will be zero or greater, and the sum of q, r and s will be between 10 and 18, inclusive.

Thus, for example, if 9,12-linoleic acid ester is the starting material, the formylated ester will be a 9(10), 12(13) diformyloctadecanoate, that is, a mixture of the 9-12, 9-13, 10-12, 10-13 diformyl esters. When this mixture is hydrogenated the corresponding di-hydroxymethyloctadecanoates will be obtained.

A tri-unsaturated starting material will partially reduce giving a mixture of isomers. Without discussing all the particular isomers present when 9,12,15-linolenic acid ester is employed, the product will be a diformyl mixture of the 9(10), 12(13), and 15(16) isomers.

The hydroxymethyl monomer can also be prepared as a gem-bis(hydroxymethyl)ester of the formula (again using the methyl ester as an example):

$$CH_3-O-\overset{O}{\underset{\|}{C}}-(CH_2)_m-\overset{CH_2OH}{\underset{\underset{CH_3}{|}}{\overset{|}{C}}}-CH_2OH$$
$$\phantom{CH_3-O-C-(CH_2)_m-}(CH_2)_nCH_3$$

where m and n are as previously defined.

The preparation of these gem-bis(hydroxymethyl) compounds follows the procedure disclosed in U.S. Pat. No. 4,307,224 to Rogier, except that unsaturated esters as opposed to the unsaturated alcohol analogs are used as the starting material. Accordingly, to the extent necessary for the understanding of the subject invention, the disclosure of the foregoing patent is hereby incorporated by reference.

The initiating polyols which are reacted with the hydroxymethyl compounds to obtain the polyester polyols may be generically identified by the formula:

$$R(OH)_p$$

where p is 2 to 6.

As shown by this formula, the initiating polyol must have at least two active hydrogens. Polyols which meet this requirement include diols, triols, tetrols and even higher polyols. The choice of the polyol will depend upon the functionality desired in the product polyester polyol.

Exemplary of useful diols include such materials as ethylene glycol, neopentylglycol, diols of the formula:

$$H(CH_2)_hCH(CH_2OH)(CH_2)_kCH_2OH$$

where k is >3; and h+k are non-zero integers, the sum of which is from 12 through 20.

An example of such material is 9(10)-hydroxymethyloctadecanol. Additional diol materials which may be used in the present invention include 1,4-bishydroxymethylcyclohexane. Further diol materials include a compound of the formula:

$$\begin{array}{c} \phantom{R_4-}CH_2-CH_2 \\ R_4-CH\phantom{-CH_2-CH_2-}CH-R_1 \\ \phantom{R_4-}CH-CH \\ \phantom{R_4-C}R_3\phantom{H-CH}R_2 \end{array}$$

wherein $R_1$, $R_2$, $R_3$ and $R_4$ have a total of from 30 to 38 carbon atoms and are each straight-chained alkyl groups having at least 5 carbon atoms, and wherein two of these alkyl groups have omega-hydroxyl substituents. Such later described materials are described in British Pat. No. 1,043,507.

Further useful diols which may be utilized in the present invention include compounds of the formula:

(HOCH$_2$)$_2$— [bicyclic structure] (IA)

and (HOCH$_2$)$_2$— [bicyclic structure with double bond] (IB)

and mixtures thereof.

Specific compounds within the scope of the foregoing formulas are 8,8-bis(hydroxymethyl)-tricyclo[5,2,1,0$^{2,6}$]decane and 8,8(9,9)-bis(hydroxymethyl)-tricyclo[5,2,1,0$^{2,6}$]decene.

Still further diol materials which may be used in the present invention include 2,5-hexanediol; 1,6-hexanediol; Dimerol alcohol, a 36 carbon diol available from the Henkel Corporation; 1,4-cyclohexane diol; Polybd R-45HT, a butadiene diol having an approximate molecular weight of 2800; hydrogenated bisphenol A, and other similar materials. An additional diol which may be employed is the diol which is a member selected from the group consisting of 3(4),8(9)-(bishydroxymethyl)-tricyclo[5,2,1,0$^{2,6}$]decane.

Suitable triol materials include trimethylol propane and the triols disclosed in U.S. Pat. No. 4,216,344 to Rogier. However, in some instances the presence of secondary hydroxyl groups can cause problems in the properties of the molecules such as sweating wherein the product appears to be wet and not fully cured. Therefore, as a practical matter, triols should contain no secondary hydroxyl groups and/or should preferably contain more than 3 carbon atoms so that any secondary hydroxyl group is not hindered by the close positioning of the primary hydroxyl groups within the molecule.

Further triols useful in the present invention include the triols described by Rogier in U.S. Pat. No. 4,216,344. A suitable example of such materials includes 9,9(10,10)-bishydroxymethyloctadecanol.

It is further noted that it is possible to use triols in combinations with other polyols, a particularly valuable blend being that found described by Rogier in U.S. Pat. No. 4,243,818. Additional examples of triols which may be employed include 1,2,6-hexanetriol and other similar materials.

Tetrols include such materials as pentaerythritol. Higher polyols include those pentols described in U.S. Pat. No. 4,216,344 issued to Rogier.

Further polyols which are useful include materials from the work of Rogier in U.S. patent application, Ser. No. 233,793, filed Feb. 12, 1981. Such compounds are shown below:

CH$_3$(CH$_2$)$_x$—[cyclohexene ring]—(CH$_2$)$_y$CH$_2$OH (I)

with substituents R$_1$, R$_2$, R$_3$, R$_4$ and

CH$_3$(CH$_2$)$_x$—[cyclohexane ring]—(CH$_2$)$_y$CH$_2$OH (II)

with substituents R$_1$, R$_2$, R$_3$, R$_4$ and mixture thereof wherein $R_1$ and $R_2$ are selected from the group consisting of hydrogen and methyl and mixtures thereof with the provision that one such member must be hydrogen; and $R_3$ and $R_4$ are hydrogen or hydroxymethyl provided that at least one of $R_3$ and $R_4$ must be hydroxymethyl, and further that x is an integer of from 3 through 6 and y is an integer from 6 through 9 and that the sum $x+y$ is 12.

As discussed previously, the polyester polyols are prepared by a transesterification reaction. The starting materials comprising the hydroxymethyl ester monomer and the initiating polyol are mixed together in proportions which are selected to achieve the desired product. Mixtures of different polyols as well as different hydroxymethyl ester monomers may also be used as the starting materials for the reaction. Mixed hydroxymethyl esters generally occur when the starting material is derived from naturally occurring fatty oils.

The temperature of the reaction mixture is gradually raised until an alkanol is generated. The particular alkanol produced will depend upon the alkyl moiety of the ester group. Thus, when the hydroxymethyl ester reactant is methyl ester, methanol is generated. The alkanol is preferably drawn off from the reaction mixture to encourage a substantially complete reaction. Ideally, no more than a minor amount of the starting hydroxymethyl ester should remain in the end product as this material is mono-functional in reactions with polyisocyanates, and therefore acts as a chain terminating agent in the reaction to form polyurethanes.

The optimum reaction temperature will vary depending upon the catalyst selected for the reaction, if any, and the reactivity of the reactants. Generally, the reaction is enhanced by the use of catalysts such as dibutyl tin oxide, butyltin tris(2-ethylhexoate), butylchlorotin dihydroxide, tetrabutyl orthotitanate, calcium acetate-/antimony oxide and base catalysts such as sodium methoxide.

In the preparation of the hydroxymethyl polyol reactants, it is important to avoid gellation, i.e., formation products of infinitely high viscosity and insolubility in all nondegrading solvents. Gellation can be avoided by limiting the extent of conversion or generally more preferably by using quantities of reactants far from the amounts required stoichiometrically. For a discussion of gellation see Flory, "Principles of Polymer Chemistry", Cornell University Press, 1953, p.47, 347.

To form the alkoxylated compounds of the invention, the polyester polyols produced as previously described are reacted with alkoxylating compounds such as ethylene oxide, propylene oxide or mixtures of these compounds. The amount of alkoxylating compound required depends upon the hydroxyl functionality of the polyester polyol reactant and the degree of alkoxylation desired. Generally the amount of alkoxylating compound can be expressed as a ratio of moles of alkoxylating compound per hydroxyl equivalent in the polyester polyol. This ratio will generally fall within the range of 0.5:1 to 5:1, although ratios between 1:1 and 2:1, inclusive, are most preferred.

The reaction of the polyester polyol with alkylene oxide results in a statistically distributed yield of products, depending upon a number of factors including the ratio of moles of alkylene oxide to equivalents of hydroxyl in the polyester polyol. For example, when a polyester polyol formed from methyl hydroxymethyloctadecanoate and an initiating polyol is reacted with ethylene oxide, the reaction proceeds as follows:

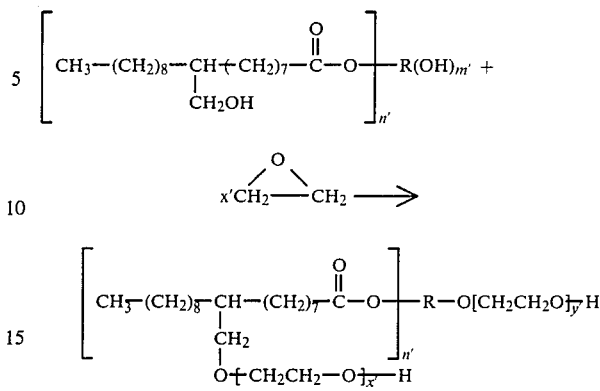

In the case where n' and m' are both one and the ratio of equivalents of ethylene oxide to hydroxyl equivalents in the polyester polyol is 1:1, the principal ethyoxylated product will be that in which both x' and y' are approximately one. This is because both primary hydroxyls in the polyester polyol are approximately equal in reactivity. Depending upon any inequality of reactivity between these two hydroxyl groups, the values of x' and y' will be slightly greater or slightly less than one, but the sum of x'+y' will be equal to two. Also, in a statistical minority of cases, two equivalents of ethylene oxide will react on one hydroxyl, thereby reducing the ethylene oxide on the other hydroxyl correspondingly, to produce, for example, a compound of the formula:

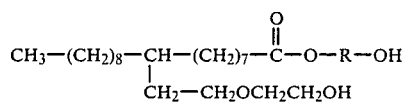

When n' and/or m' become greater than one, or where the ratio of ethylene oxide to hydroxyl equivalents is greater than one, the reaction becomes statistically more complex, although the underlying principles remain basically the same. Thus, it is evident that the reaction product of one or more polyester polyols and one or more alkoxylating compounds will be a mixture of alkoxylated compounds having varying degrees of alkoxylation.

The optimum reaction temperature for the alkoxylation reaction will vary depending upon the reactivity of the reactants. Typically, the reaction is conducted at temperatures exceeding 100° C. and at elevated pressure. Catalysts are generally not required.

As previously noted, the alkoxylated polyester polyols of the invention are particularly useful in the manufacture of urethanes through reaction with polyisocyanates. Suitable polyisocyanates include ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, diphenylmethane diisocyanates, polymethyleneisocyanates, the 2,4- and 2,6-toluene diisocyanates, the 1,3- and 1,4-xylylene diisocyanates, bis(4-isocyanatoethyl) carbonate, 1,8-diisocyanato-p-methane, 1-methyl-2,4-diisocyanatocyclohexane, the chlorophenylene diisocyanates, naphthalene-1,5-diisocyanate triphenylmethane-4,4', triisocyanate, isopropylbenzene-alpha-4-diisocyanate, 5,6-bicyclo[2.2.1]hept-2-ene diisocyanate, 5,6-diisocyanatobutylbicyclo[2.2.1]hept-2-ene and similar polyisocyanates.

Of particular interest in the present invention are trimethylhexamethylene diisocyanate available from VEBA, heptadecyl (C17) diisocyanate, DDI 1410 an aliphatic C-36 diisocyanate available from the Henkel Corporation of Minneapolis, Mn. (generally such diisocyanates having from 12 to 40 carbons in the aliphatic radical may be used in the present invention) and Isonate 143L, a modified diphenylmethane diisocyanate (MDI) available from Upjohn Corp. Further urethane components are isophorone diisocyanate available from VEBA and Desmodur N an aliphatic triisocyanate available from Mobay. Desmodur N is more particularly defined as the reaction product of 3 moles of hexamethylene diisocyanate and water having an isocyanate equivalent weight as later defined of 191. Other adducts or prepolymers of the polyisocyanate include Desmodur L and Mondur CB which are the adducts of toluene diisocyanate. The foregoing materials have any isocyanate equivalent weight of approximately 250.

The amount of the polyisocyanate utilized in forming the urethane compositions of the present invention is expressed on a percentage equivalent weight basis with respect to the hydroxyl functionality of the alkoxylated polyester polyol. Desirably, each hydroxy functional group on the polyol will react on a 1:1 stoichiometric basis with the isocyanate functionality of the polyisocyanate compound. It is quite feasible, however, to form the urethane linkage using from about 80% to 120% preferably from about 95% to 105% on a hydroxyl-isocyanate equivalent basis of the polyisocyanate to form the urethane product. The determination of the amount of polyisocyanate required for a given polyol reactant is readily made using hydroxyl or isocyanate equivalent weights as is well known to those of skill in the art. Mixtures of polyisocyanates and alkoxylated polyester polyols may also be used in accordance with these parameters.

Cross-linked polyurethanes are obtained whenever the hydroxyl functionality of the polyol reactant is greater than 2.0. Otherwise, thermoplastic polyurethanes are obtained.

To form the urethane reaction product, the polyol and the organic polyisocyanate reactants are mixed together in the proper proportions. When utilized as a coating the compounds are then quickly spread with a knife blade, brush or spray over the surface of the article to be coated. Where molded articles are desired various techniques such as casting, injection molding, reaction injection molding may be employed.

If desired, various urethane catalysts may be employed to promote the reaction. Examples of such urethane catalysts include triethylene diamine, N-ethyl-morpholine, dimethyl piperazine, triethylamine, N,N,N',N'-tetramethylbutane-1,3-diamine, dibutyltin dilaurate, stannous octoate, stannous oleate, and stannous tallate, as well as other art recognized urethane catalysts. Typical levels of the urethane catalyst are from about 0.001% to about 5% by weight of the urethane components.

Trimerization catalysts such as diethylene diamine and $BF_3$ derivatives, can be included in the reaction mixture to convert the polyisocyanates to polyisocyanurates in situ and thence to polyurethanes.

One or more additional polyols may be included in reaction mixture to modify the properties of the resulting polyurethane, principally hardness and elasticity. Short chain polyols act as hard segment contributors to increase elastomer hardness while long chain polyols act as soft segment contributors to enhance the elastic properties of the elastomer. Such modifying polyols include alkyl or cycloalkyl polyols, ester linked polyols, ether linked polyols, ether and ester linked polyols and hydroxy functional acrylic copolymers.

Specific examples of alkyl and cycloalkyl polyols include 2,5-hexanediol, 1,6-hexanediol, ethylene glycol, glycerol, 1,2,6-hexanetriol, pentaerythritol, 1,4-cyclohexane diol, and 1,4-butane diol.

Examples of ester linked saturated polyols include Niax PCP0200 and PCP0240 both available from Union Carbide and having respective molecular weights of approximately 530 and 2000. Both of the foregoing compounds are diols. Niax PCP0300 also available from Union Carbide is a caprolactone-ester triol having an approximate molecular weight of 540. Niax PCP0310 also available from Union Carbide is a caprolactone-ester triol having a molecular weight of approximately 900.

The ether linked saturated polyols include compounds such as diethylene glycol and triethylene glycol both available from Fisher. Other ether linked saturated polyols include Teracol 1000 and 2000, available from Dupont. Further ether linked saturated polyols useful in the present invention include the Polymeg Q0650, Q0100, and Q0200 all of which are ether diols available from Quaker having a respective molecular weight of approximately 650, 1000 and 2000. Pluracol P1010 having an approximate molecular weight of 1050 available from Wyandotte is an example of a polypropylene oxide ether linked diol useful in the present invention. Similar Wyandotte products useful as saturated polyols in the present invention include Pluracol TP440 and 150 which are propylene oxide ether linked triols having respective molecular weights of approximately 425 and 1560. In similar fashion Pluracol GP3030 is another saturated polyol suitable for the present invention available from Wyandotte. The foregoing material is a glycerine polypropylene ether linked triol having an approximate molecular weight of 2900.

Additional Pluracols useful in the present invention include Pluracol PEP450 which is a pentaerythritol polypropylene oxide ether linked tetrol having a molecular weight of 405 and Pluracol 493 an ether linked tetrol having a molecular weight of approximately 3630.

In addition, polyols having hydroxyl functionalities greater than 2.0 may be included in the reaction mixture as cross-linking agents. Suitable polyols for this purpose are disclosed in U.S. Pat. No. 4,216,344, issued Aug. 5, 1980 to Rogier. Additional materials which may be used as cross-linking agents are found in the application of Rogier, Ser. No. 233,793, filed Feb. 12, 1981.

Numerous other modifying agents may be added to the polyurethanes of the invention to adapt the elastomer to particular uses. Thus, fillers such as carbon blacks, zinc oxide, titanium oxide and the like can be added. Plasticizers and dyes are other examples of suitable modifying agents.

Depending upon the viscosity of the reactants, they may be heated to enhance mixing. For convenience, the reactants may be heated to the temperature of reaction typically from about 0° to about 110° C., preferably from about room temperature, i.e., 22° C. to about 85° C. The system is operated under a high vacuum to degas the reaction mixture for about 15 minutes. The reaction mixture is then cured for a time period of from about one to twenty-four hours depending upon the curing temperature and the particular polyurethane formed. Optimum curing cycles can be readily determined without undue experimentation by those of skill in the art.

Polyurethanes of the invention may also be prepared as isocyanate terminated pre-polymers by conducting the reaction with a substantial excess of polyisocyanate and not curing the reaction mixture. The pre-polymer provides an intermediate form of the polyurethane which is more convenient to handle than the individual reactants. Ply mixing the pre-polymer with additional polyol and curing, the pre-polymer is converted to a polyurethane resin.

Pre-polymers are particularly useful in making microcellular foam. The pre-polymer is mixed with polyol and a blowing agent and then poured into a mold which is heated to form microcellular polyurethane foam.

Polyurethanes prepared in accordance with the invention exhibit low water absorption, good retention of strength after exposure to hot water and good flexibility. They have utility in a wide range of applications as elastomers, foams, protective coatings and adhesives. In addition, because one of the two principal reactants can be derived from naturally occurring fatty oils, the manufacturing process is efficient and economical.

To further illustrate various aspects of the invention, the following Examples are provided. However, it is to be understood that these Examples are purely illustrative and are in no way intended to limit the scope of the invention.

EXAMPLE 1

To 478.1 grams, 1.4 moles, of 9(10)-methylhydroxymethyloctadecanoate (referred to hereinafter as $C_{19}HME$) were added 139.6 grams, 0.7 mole, of bishydroxymethyl tricyclodecane (BHMTCD) and 0.12 grams of butyltin tris (2-ethylhexoate), (BTTEH), catalyst. The reactants were heated under $N_2$ to 202° C. at which temperature methanol began to evolve and kept evolving for $4\frac{1}{2}$ hours at which time the temperature in the reaction pot was 232° C. Analysis by gas chromatography showed that no $C_{19}HME$ remained but some unreacted BHMTCD did remain. Analysis by gel permeation chromatography revealed that there was some ($C_{19}HME$)BHMTCD but that there was more ($C_{19}HME$)$_2$ BHMTCD and higher oligomers.

This product had a viscosity of 40 poises at 23° C. and a hydroxyl equivalent weight of 455.

EXAMPLE 2

To 410 grams, 1.2 moles, of $C_{19}HME$ were added 86.5 grams, 0.6 mole, of 1,4 cyclohexanedimethanol and 0.12 grams of butyltin tris (2-ethylhexoate). The reactants were degassed under vacuum at 95° C. After releasing the vacuum with $N_2$ the reactants were stirred and heated to 165° C. at which temperature methanol began to evolve. Heating was continued for about 6 hours with the reaction pot temperature rising to as high as 200° C.

This product had a viscosity of 26.4 poises at 23° C. and a hydroxyl equivalent weight of 406.

EXAMPLE 3

To 740 grams, 2.17 moles, of $C_{19}HME$ were added 97.5 grams, 1.08 moles of 1,4 butane diol (1,4 BD). The reactants were degassed at 85° C. with stirring under vacuum for 30 minutes at which time 0.05 grams of tetrabutylorthotitanate was added. The reactants were heated for $1\frac{1}{2}$ hours at 170° C. while methanol evolved. Analysis by gas chromatography showed both 1,4 butane diol and $C_{19}HME$ still in the reaction mix. Heating was continued further at temperatures up to 200° C. for an additional 5 hours at which time $C_{19}HME$ disappeared from the reaction.

The product had a viscosity of 11.3 poises at 23° C. and a hydroxyl equivalent weight of 368. Analysis by gel permeation chromatography showed this product to have some ($C_{19}HME$)BD but much larger amounts of ($C_{19}HME$)$_2$ BD and high oligomers.

EXAMPLE 4

To 341.5 grams, 1.0 mole, of $C_{19}HME$ were added 199.4 grams, 1.0 mole, of bishydroxymethyl tricyclodecane and 0.08 grams butyltin tris (2-ethylhexoate) catalyst. These reactants were heated to 200° C. and held for two hours while methanol evolved. Another 0.04 grams of catalyst was added and heating at 200° C. was continued another 5 hours.

The product had a viscosity of 74.8 poises at 23° C. and a hydroxyl equivalent weight of 256.

EXAMPLE 5

To 409.8 grams, 1.2 moles, of $C_{19}HME$ were added 179.6 grams, 1.2 moles, of trimethylol propane. Butyltin tris (2-ethylhexoate) catalyst was added three times, 0.04 grams each time, to the reaction as it progressed. The reaction schedule was 1 hour 206°–215° C., 2 hours 225°–240° C., and $4\frac{1}{2}$ hours at 235°–255° C. The product was stripped of volatiles under vacuum at about 80° C.

The viscosity was 37.2 poises at 23° C. The hydroxyl equivalent weight was 157.

EXAMPLE 6

To 683 grams, 2.0 moles, of $C_{19}HME$ were added 68 grams, 0.5 moles, of pentaerythritol and 0.04 grams of butyltin tris (2-ethylhexoate) catalyst. The reaction was stirred and heated to 200° C. for 3 hours. Another 0.04 grams catalyst was added. It was heated 208°–235° C. for $2\frac{1}{2}$ hours and another 0.04 grams of catalyst was added as the rate of methanol evolution decreased. Final heating period was $3\frac{1}{2}$ hours at 235°–255° C. The hazy reaction product was filtered.

The viscosity was 45.3 poises at 23° C. and the hydroxyl equivalent weight was 442.

EXAMPLE 7

To 288.2 grams of the ester diol of Example 1 were added 2 grams of potassium hydroxide. Heating and stirring at 30–45 psi and temperatures of 120°–145° C., ethylene oxide, two units per hydroxyl, 78.3 moles, was added intermittently over a four hour period until all had been reacted. The alkaline catalyst was neutralized with Amberlyst ion exchange resin and filtered. The hydroxyl equivalent weight was 455.

EXAMPLE 8

In a similar manner as in Example 7, the ester diol of Example 2 was ethoxylated to one unit of ethylene oxide per hydroxyl equivalent in the diol using potassium hydroxide catalyst.

This product had a hydroxyl equivalent weight of 446 and a viscosity of 35.5 poises at 23° C.

EXAMPLE 9

Using the procedure of Example 7, the ester diol of Example 3 was ethoxylated, adding one unit of ethylene oxide per hydroxyl equivalent present in the diol.

This product had a viscosity of 8 poises at 23° C. and a hydroxy equivalent weight of 456.

EXAMPLE 10

Using a procedure similar to that of Example 7, the ester diol of Example 4 was ethoxylated, adding one unit of ethylene per hydroxyl of the diol.

This product had a viscosity of 35.5 poises at 23° C. and a hydroxy equivalent weight of 446

EXAMPLE 11

Using a procedure similar to Example 7, the ester triol of Example 5 was reacted with ethylene oxide at a ratio of one mole of ethylene oxide per hydroxyl of the triol.

This product had a viscosity of 15 poises at 23° C. and a hydroxyl equivalent weight of 185.3

EXAMPLE 12

Using a procedure similar to Example 7, the tetrol of Example 6 was reacted with ethylene oxide at a ratio of one mole of ethylene oxide per hydroxyl of the tetrol.

This product had a viscosity of 43.9 poises at 23° C. and a hydroxyl equivalent weight of 602.

In Examples 13–18, the elastomer properties were determined in accordance with the following elastomer test procedures:

---

Tensile ultimate strength, ASTM D 412
Percentage Elongation, ASTM D 412
Split Tear, ASTM D 1938
Compression Set, ASTM D 395, Method B Type 1
Water Absorption, ASTM D 570. 70° C. H$_2$O 24 hrs
Torsional Rigidity, T$_f$, T$_4$ ASTM D 1043
  T$_f$ = temperature at which modulus in torsion reaches 45,000 psi
  T$_4$ = temperature at which modulus in torsion reaches 3333 psi
Durometer Hardness, ASTM D 2240
Hydrolytic Stability SATRA Method, 14 psi, 120° C. steam

---

EXAMPLE 13

A urethane elastomer was prepared from the alkoxylated diol of Example 7. The alkoxylated diol was blended with a polyol and reacted with diisocyanate as follows:

|  | Equiv. | Grams |
|---|---|---|
| Diol of Example 7 | 0.2 | 90.1 |
| Modifying polyol 1,4 butane diol | 0.3 | 13.5 |
| Isonate 143L diisocyanate (a modified diphenylmethane diisocyanate (MDI) containing a high percentage of MDI and a lesser amount of poly carbodiimide adducts) | 0.5125 | 74.6 |

The diols were degassed under vacuum at 70°–80° C., cooled to 25° C. and the Isonate 143L added. Vacuum was again applied for 6 minutes during which the heat of exothermic reaction raised the temperature to 70° C. at which time the reaction mix was poured into molds and cured for 20 hours at 100° C.

The elastomer had the following properties:

| Shore hardness | 48 D |
|---|---|
| Tensile strength, psi | 2790 |
| Elongation, % | 220 |
| Split tear, PI | 509 |
| Compression set, % | 100 |
| Water absorption, 24 hrs at 70° C., % | 0.8 |
| Hydrolytic stability, % retained tensile strength | 100 |
| Torsional Rigidity | |
| T$_f$ °C. | −20 |
| T$_4$ °C. | +26 |

EXAMPLE 14

An elastomer was prepared from the diol of Example 8 modifying with other diols in the amounts indicated. The method was essentially that of Example 13.

|  | Equiv. | Grams |
|---|---|---|
| Diol of Example 8 | 0.21 | 89.2 |
| 1,4 butane diol | 0.08 | 3.6 |
| Hydroxymethyl octadecanol | 0.16 | 11.1 |
| Bis(hydroxymethyl)octadecanol | 0.11 | 5.9 |
| Isonate 143L | 0.56 | 38.8 |

The elastomer had the following properties:

| Shore hardness | 56 D |
|---|---|
| Tensile strength, psi | 3697 |
| Elongation, % | 185 |
| Split tear, PI | 216 |
| Compression set, % | 54 |
| Water absorption, 24 hrs at 70° C., % | 0.8 |
| Hydrolytic stability, % retained tensile strength | 100 |
| Torsional Rigidity | |
| T$_f$ °C. | −13 |
| T$_4$ °C. | +29 |

EXAMPLE 15

An elastomer was prepared from the following ingredients in the amounts indicated, using the method of Example 13.

|  | Equiv. | Grams |
|---|---|---|
| Diol of Example 9 | 0.164 | 74.75 |
| 1,4 butane diol | 0.41 | 18.45 |
| Isonate 143L | 0.588 | 47.90 |

The elastomer had the following properties:

| Shore hardness | 58 D |
|---|---|
| Tensile strength, psi | 3006 |
| Elongation, % | 200 |
| Split tear, PI | 242 |
| Compression set, % | 87 |
| Water absorption, 24 hrs at 70° C., % | 0.5 |
| Hydrolytic stability, % retained tensile strength | 100 |
| Torsional Rigidity | |
| T$_f$ °C. | −25 |

| | |
|---|---|
| -continued | |
| T₄ °C. | +51 |

EXAMPLE 16

An elastomer was prepared from the following ingredients in the amounts indicated, using the method of Example 13.

| | Equiv. | Grams |
|---|---|---|
| Diol of Example 10 | 0.36 | 109.0 |
| Teracol 1000 (polyoxytetramethylene glycol MW near 1000) | 0.024 | 12.9 |
| Isonate 143L | 0.40 | 58.0 |

In this example a long chain softening diol, Teracol 1000, was needed to bring the hardness within the desired range.

The elastomer had the following properties:

| | |
|---|---|
| Shore hardness | 47 D |
| Tensile strength, psi | 3627 |
| Elongation, % | 325 |
| Split tear, PI | 284 |
| Compression set, % | 88 |
| Water absorption, 24 hrs at 70° C., % | 1.0 |
| Hydrolytic stability, % retained tensile strength | 99 |
| Torsional Rigidity | |
| $T_f$ °C. | −5 |
| $T_4$ °C. | +18 |

EXAMPLE 17

An elastomer was prepared from the following ingredients in the amounts indicated, using the method of Example 13.

| | Equiv. | Grams |
|---|---|---|
| Triol of Example 11 | 0.36 | 66.1 |
| Teracol 1000 | 0.089 | 47.4 |
| Isonate 143L | 0.46 | 68.5 |

The elastomer had the following properties:

| | |
|---|---|
| Shore hardness | 42 D |
| Tensile strength, psi | 2522 |
| Elongation, % | 135 |
| Split tear, PI | 51 |
| Compression set, % | 27 |
| Water absorption, 24 hrs at 70° C., % | 1.4 |
| Hydrolytic stability, % retained tensile strength | 55 |
| Torsional Rigidity | |
| $T_f$ °C. | −23 |
| $T_4$ °C. | +14 |

EXAMPLE 18

An elastomer was prepared from the following ingredients in the amounts indicated, using the method of Example 13.

| | Equiv. | Grams |
|---|---|---|
| Tetrol of Example 12 | 0.12 | 72.24 |
| 1,4 butane diol | 0.48 | 21.60 |
| Isonate 143L | 0.615 | 89.48 |

The elastomer had the following properties:

| | |
|---|---|
| Shore hardness | 56 D |
| Tensile strength, psi | 1403 |
| Elongation, % | 30 |
| Split tear, PI | — |
| Compression set, % | 66 |
| Water absorption, 24 hrs at 70° C., % | 0.2 |
| Hydrolytic stability, % retained tensile strength | 100 |
| Torsional Rigidity | |
| $T_f$ °C. | −52 |
| $T_4$ °C. | +18 |

While the present invention has now been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims.

We claim:

1. Urethane linked reaction products of
   (a) at least one alkoxylated polyester polyol formed by reacting (i) at least one non-gelled polyester polyol of the formula:

$$R-O-A-H]_p$$

where
   R is a polyol residue;
   p is an integer from 2 to 6; and,
   A may be the same or different and is selected from the group consisting of $A_1$, $A_2$, and $A_3$, and combinations of $A_1$, $A_2$ and $A_3$,
   where

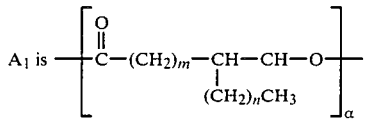

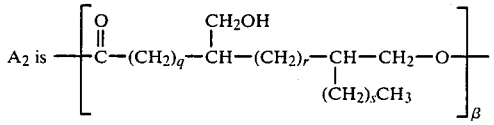

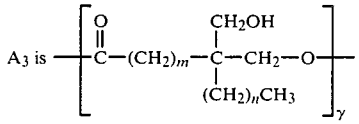

where m, n, p, q, r, α, β and γ are integers and where
m > 3
n ≧ 0 and
m + n is from 11 to 19
q > 3 r≧0
s≧0 and
q+r+s is from 10 to 18
α is from 0 to 10
β is from 0 to 10 and
γ is from 1 to 10, except that all α's, β's and γ's in any given compound are not all zero; with (ii) at least one alkylene oxide in a ratio of moles of alkylene oxide per equivalents of hydroxyl in the polyester polyol from about 0.5:1 to 5:1; and
(b) from about 80% to about 120% on a hydroxyl-isocyanate equivalent basis of at least one polyisocyanate.

2. Urethane-linked reaction products of
(a) at least one alkoxylated polyester polyol formed by reacting (i) at least one polyester polyol of the formula:

$$R^1 \left[ O \left( C(=O)-(CH_2)_m-CH(-(CH_2)_nCH_3)-CH_2-O \right)_\alpha H \right]_p$$

where
$R^1$ is a polyol residue;
p is an integer from 2 to 6;
α is an integer from 0 to 10 and may be the same or different in each bracketed moiety of the formula, except that all α's are not all zero;
m and n are integers
where
m>3
n≧0 and
m+n is from 11 to 19;
and (ii) at least one alkylene oxide in a ratio of moles of alkylene oxide to equivalents of hydroxyl in said polyester polyol from about 0.5:1 to 5:1, and
(b) from about 80% to about 120% on a hydroxyl-isocyanate equivalent basis of at least one polyisocyanate.

3. The compositions of claim 1 or 2, wherein in the formula for said polyester polyol, p is 2 and R or $R^1$ is a diol residue.

4. The compositions of claim 3, wherein the diol is 1,4-butanediol.

5. The compositions of claim 3, wherein the diol is $$R_4-CH \underset{CH-CH}{\overset{CH_2-CH_2}{\diagup\diagdown}} CH-R_1 \quad \text{with } R_3, R_2$$

wherein $R_1$, $R_2$, $R_3$ and $R_4$ have a total of from 30 to 38 carbon atoms and are each straight-chained alkyl groups having at least 5 carbon atoms, and wherein two of these alkyl groups have omega-hydroxyl substituents.

6. The compositions of claim 3, wherein the diol is ethylene glycol.

7. The compositions of claim 3, wherein the diol is neopentylglycol.

8. The compositions of claim 3, wherein the diol is a compound of the formula:

(IA) (HOCH$_2$)$_2$— [tricyclic structure]

and (IB) (HOCH$_2$)$_2$— [tricyclic structure with double bond]

and mixtures thereof.

9. The compositions of claim 8 wherein the tricyclo compound is 8,8(9,9)-bis(hydroxymethyl)tricyclo[5,2,1,0$^{2,6}$]dec-3-ene.

10. The compositions of claim 8 wherein the tricyclo compound is 8,8-bis(hydroxymethyl)tricyclo[5,2,1,0$^{2,6}$]decane.

11. The compositions of claim 3, wherein the diol is

H(CH$_2$)$_h$CH(CH$_2$OH)(CH$_2$)$_k$CH$_2$OH wherein k is 3 or greater; and h plus k are non-zero integers the sum of which is from 12 through 20.

12. The compositions of claim 11 wherein the diol is 9(10)-hydroxymethyloctadecanol.

13. The compositions of claim 3, wherein the diol is 1,4-bishydroxymethylcyclohexane.

14. The compositions of claim 3, wherein the diol is a member selected from the group consisting of 3(4), 8(9)-(bishydroxymethyl)-tricyclo[5,2,1,0$^{2,6}$]decane.

15. The compositions of claim 1 or 2, wherein R or $R^1$ is a triol residue.

16. The compositions of claim 15, wherein the triol is trimethylolpropane.

17. The compositions of claim 1 or 2, wherein R or $R^1$ is a tetrol residue.

18. The compositions of claim 17, wherein the tetrol is pentaerythritol.

19. The compositions of claim 1 or 2, wherein R or $R^1$ is derived from a polyol of the formula:

CH$_3$(CH$_2$)$_a$[C(CH$_2$OH)$_2$]$_b$(CH$_2$)$_c$C(CH$_2$OH)$_2$(CH$_2$)$_d$[C(CH$_2$OH)$_2$]$_e$(CH$_2$)$_f$CH$_2$OH and mixtures thereof, wherein
b and e are 0 and 1;
a and f are 3 or greater;
c and d are non-zero integers; and
a+b+c+d+e+f is from 11 to 19.

20. The compositions of claim 19, wherein the polyol includes a diol of the formula:

H(CH$_2$)$_h$CH(CH$_2$OH)(CH$_2$)$_k$CH$_2$OH wherein
k is 3 or greater; and
h+k is from 12 to 20.

21. The compositions of claim 19, wherein the polyol is 9,9(10,10)-bishydroxymethyloctadecanol.

22. The compositions of claim 1 or 2, wherein R and $R^1$ is a polyol residue derived from a polyol of the formula:

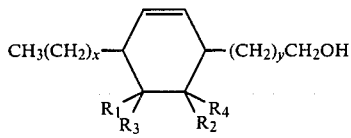

and

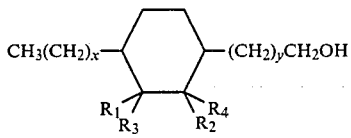

and mixtures thereof wherein $R_1$ and $R_2$ are selected from the group consisting of hydrogen and methyl and mixtures thereof with the provision that one such member must be hydrogen; and $R_3$ and $R_4$ are hydrogen or hydroxymethyl provided that at least one of $R_3$ and $R_4$ must be hydroxymethyl; and further that x is an integer of from 3 through 6 and y is an integer from 6 through 9 and that the sum $x+y$ is 12.

23. The compositions of claim 1 or 2, wherein the polyisocyanate is present at from about 95% to about 105% on a hydroxyl-isocyanate equivalent basis.

24. The compositions of claim 1 or 2, wherein the polyisocyanate is selected from the group consisting of diisocyanates, triisocyanates and mixtures thereof.

25. The compositions of claim 1 or 2, wherein the polyisocyanate is an aromatic isocyanate.

26. The compositions of claim 1 or 2, wherein the polyisocyanate is an aliphatic or cycloaliphatic isocyanate.

27. The compositions of claim 1 or 2, wherein the polyisocyanate is selected from the group consisting of toluene diisocyanate, xylene diisocyanate, isophorone diisocyanate, hexamethylene diisocyanate, the triisocyanate adduct of hexamethylene diisocyanate and water, trimethyl hexamethylene diisocyanate, diphenylmethane diisocyanate, aliphatic diisocyanates having 12 to 40 carbon atoms in the aliphatic moiety and mixtures thereof.

28. The compositions of claim 1 or 2, wherein said reaction product is formed from at least one of said alkoxylated polyester polyols, at least one of said polyisocyanates and at least one modifying polyol.

29. The compositions of claim 28, wherein said modifying polyol is selected from the group consisting of alkyl and cycloalkyl polyols, ester linked polyols, ether linked polyols, ether and ester linked polyols and hydroxy functional acrylic copolymers.

30. The compositions of claim 1 or 2, further comprising modifying agents selected from the group consisting of fillers, dyes and plasticizers.

31. The compositions of claim 1 or 2, wherein said reaction product is formed in the presence of a trimerization catalyst.

32. An elastomer formed from a urethane linked reaction product of claim 1 or 2.

33. A microcellular foam formed from a urethane linked reaction product of claim 1 or 2.

34. A protective coating formed from a urethane linked reaction product of claim 1 or 2.

35. An adhesive formed from a urethane linked reaction product of claim 1 or 2.

* * * * *